United States Patent
Pizzi et al.

(10) Patent No.: US 10,316,224 B2
(45) Date of Patent: Jun. 11, 2019

(54) WOOD ADHESIVES FOR PRODUCING PARTICLE BOARDS

(71) Applicants: SYRAL BELGIUM NV, Aalst (BE); UNIVERSITE DE LORRAINE, Nancy (FR)

(72) Inventors: Antonio Pizzi, Nancy (FR); Marie-Christine Lagel, Nancy (FR); Andreas Redl, Aalst (BE)

(73) Assignees: TEREOS STARCH AND SWEETENERS BELGIUM, Aalst (BE); UNIVERSITE DE LORRAINE, Nancy (FR)

( * ) Notice: Subject to any disclaimer, the term of this patent is extended or adjusted under 35 U.S.C. 154(b) by 316 days.

(21) Appl. No.: 15/027,950

(22) PCT Filed: Oct. 7, 2014

(86) PCT No.: PCT/IB2014/065129
§ 371 (c)(1),
(2) Date: Apr. 7, 2016

(87) PCT Pub. No.: WO2015/052657
PCT Pub. Date: Apr. 16, 2015

(65) Prior Publication Data
US 2016/0369138 A1 Dec. 22, 2016

(30) Foreign Application Priority Data
Oct. 7, 2013 (FR) .................. 13 02320

(51) Int. Cl.
| | | |
|---|---|---|
| C09J 161/00 | (2006.01) |
| C09J 161/06 | (2006.01) |
| C08H 1/00 | (2006.01) |
| C09J 189/00 | (2006.01) |
| C08L 89/00 | (2006.01) |
| C08L 97/02 | (2006.01) |
| C08J 9/00 | (2006.01) |
| C08L 61/06 | (2006.01) |
| B27N 3/02 | (2006.01) |
| B27N 3/04 | (2006.01) |
| C08K 5/103 | (2006.01) |
| C08K 5/17 | (2006.01) |
| B27N 3/00 | (2006.01) |

(52) U.S. Cl.
CPC .............. C09J 161/06 (2013.01); C08H 1/00 (2013.01); C08J 9/0061 (2013.01); C08L 61/06 (2013.01); C08L 89/00 (2013.01); C08L 97/02 (2013.01); C09J 189/00 (2013.01); *B27N 3/002* (2013.01); *B27N 3/02* (2013.01); *B27N 3/04* (2013.01); *C08J 2205/10* (2013.01); *C08J 2361/10* (2013.01); *C08J 2489/00* (2013.01); *C08K 5/103* (2013.01); *C08K 5/175* (2013.01)

(58) Field of Classification Search
CPC .......... C08H 1/00; B27N 3/002; C09J 189/00; C09J 161/06
See application file for complete search history.

(56) References Cited

U.S. PATENT DOCUMENTS

| | | | | |
|---|---|---|---|---|
| 2002/0153112 A1* | 10/2002 | Vijayendran | .......... | B27N 3/002 162/164.6 |
| 2005/0257888 A1* | 11/2005 | Williamson | ............. | B27D 1/04 156/331.1 |

FOREIGN PATENT DOCUMENTS

WO  WO 2008/026056 A2  3/2008

OTHER PUBLICATIONS

Kreibich et al., "New adhesives based on soybean proteins", Holzforschung Uno Holzverwertung, No. 5, (Jan. 1, 1995), p. 87.
International Search Report dated Dec. 17, 2014.

* cited by examiner

*Primary Examiner* — Kara B Boyle
(74) *Attorney, Agent, or Firm* — Symbus Law Group, LLC; Clifford D. Hyra

(57) ABSTRACT

A composition based on phenolic resin comprising at least one phenolic resin, a vegetable protein hydrolysate, preferentially a wheat gluten hydrolysate, and an agent for accelerating curing, and also to the process for the production thereof.

11 Claims, No Drawings

WOOD ADHESIVES FOR PRODUCING PARTICLE BOARDS

This application claims the benefit of French patent Application No. 13/02320, filed Oct. 7, 2013, which is hereby incorporated by reference in its entirety.

FIELD OF THE INVENTION

Background

The present invention relates to a composition based on phenolic resins, such as adhesive wood glue compositions. In particular, such compositions are used for producing particle or fiber boards which meet the technical requirements enabling them to be used in a humid environment. At the same time, these boards must meet technical requirements concerning emissions of formaldehyde in which they can be classified in class E1 according to European standard EN 312 relating to the requirements concerning particle boards by application of European Directive DI 89/106/CE Dec. 21, 1988.

The manufacture of particle boards or fiber boards is based on the bonding of lignocellulosic fibers or of particles using a bonding agent. This bonding agent is usually obtained from a synthetic glue containing formaldehyde. During their use, the particle boards thus prepared have a tendency to release formaldehyde. In 2005, formaldehyde was classified as a carcinogenic substance by the WHO. Consequently, it is very important for the formaldehyde emissions originating from these wood boards to be limited to a minimum. Here already, certain efforts have been undertaken in order to modify, along these lines, formaldehyde-based resins such as urea-formaldehyde resins (UF-resins), melamine-urea-formaldehyde resins (MUF-resins) and phenol-formaldehyde resins (PF-resins).

In addition, there are also various types of fiber or particle boards which correspond to various quality requirements. Typical quality requirements are linked to the mechanical strength in combination with requirements in terms of moisture resistance. In order to comply with these requirements, various resins are used. In the case where good moisture resistance is desired, it is preferable to use glues based on phenolic resins.

At the same time, there is also a willingness to recover value from biomass, a renewable resource, and to replace products obtained from fossil resources. In this context, the use of renewable resources in biobased adhesives is well known. Since the beginning of the 1900s, the use of adhesives based on soya flour has enabled plywood to become a profitable substitute for solid wood, for inside applications. Adhesives have been improved in order to give better water resistance, but they have never reached a sufficient moisture resistance for manufacturing plywood of sufficient quality for use outside. Today, most of these biobased adhesives have been replaced by synthetic adhesives owing to cost, durability and availability factors. With the increase in the cost of oil-based adhesives, adhesives based on soya flour are again being studied (Wescott and Frihart, 38*th International Wood Composites Symposium Proceedings,* 2004).

Compared with soya flour, other protein sources are considered to be less attractive because of their availability and their cost. Despite this, very little research has been carried out in the past with regard to the other protein sources. No successful solution has been proposed in order to provide resin compositions containing proteins which have sufficient moisture resistance.

SUMMARY

The objective of this patent application is therefore to provide a composition based on phenolic resin, such as an adhesive composition of wood glue or a rigid phenolic foam comprising a protein component, in particular a vegetable protein component, which allows the manufacture of articles based on wood particles or fibers, which can be used in a humid environment, and which meet the requirements of class E1 for formaldehyde emission according to standard EN 312. This means that the formaldehyde emission values must be less than 6.5 mg/100 g of dry board, as determined by the method described in standard EN 717-3. The internal cohesion under dry and wet conditions is expressed by specific internal bonding values, determined according to EN 319 and EN 321 and the internal swelling after 24 hours according to standard EN 317. These values indicate whether the glue can be used for producing particle or fiber boards, with the required properties.

The object of the invention is achieved by a composition based on phenolic resin, preferentially an adhesive composition or a foam (typically a rigid foam) comprising at least one phenolic resin, a vegetable protein hydrolyzate, and an agent for accelerating curing.

In one embodiment of the invention, the vegetable protein hydrolyzate is obtained from a cereal protein, preferably wheat gluten.

In one preferred embodiment of the composition according to the invention, 10 to 25 mol % of the phenol of said phenolic resin is replaced with a vegetable protein hydrolyzate, and the phenol:aldehyde mole ratio is 1:1.5 to 1:1.7. When the phenolic resin is a phenol:formaldehyde resin, the adhesive composition comprises a phenolic resin in which from 10 to 25 mol % of the phenol is replaced with a vegetable protein hydrolysate, and such that the phenol:formaldehyde mole ratio is from 1:1.5 to 1:1.7.

According to the invention, the term "phenolic resin" is intended to mean any product of resinous reaction of a phenol, such as phenol, resorcinol, phenol substituted with an alkyl group such as cresol, xylenol, p-tert-butylphenol and p-phenylphenol, with an aldehyde, such as formaldehyde, acetaldehyde or furfuraldehyde. By way of indication, an example of phenolic resin is Plyophen J-325 or Phenolite J-325.

The phenolic resin in which the phenol is replaced with a vegetable protein hydrolysate according to the invention can be obtained for example by mechanical mixing.

According to the invention, the term "agent for accelerating curing" is intended to mean an agent for accelerating the curing of the phenolic resin, such as a molecule comprising at least one functional ester group, typically a glycerol ester. For example, the agent for accelerating the curing of the phenolic resin is chosen from triacetin, butyrolactone, caprolactone and propylene carbonate.

Triacetin or glyceryl triacetate (No. CAS 102-76-1) is a triester of glycerol and of acetic acid. This triglyceride is obtained by esterification of natural glycerine. It can also be obtained from acetic anhydride in petrochemistry. Its chemical formula is $C_9H_{14}O_6$ and its molecular weight is 218.21 g/mol.

In a more preferred embodiment, the triacetin content can range between 4% and 10% by weight of the resin solids, preferably between 6% and 8%. The solids are measured by the ISO 3251 method applicable to paints, varnishes and plastic. More particularly, this measurement is carried out on samples weighing 3±0.5 g, these samples are heated for 60 minutes at 135° C. and the solids are determined and expressed as percentage by weight.

The vegetable protein hydrolysate used can be obtained by acid hydrolysis, alkaline hydrolysis or enzymatic hydrolysis or by a combination thereof. In one preferred embodiment, acid and/or enzymatic hydrolysis of the proteins is used. Typically, the vegetable protein hydrolysate is also deamidated. The hydrolysis and/or deamidation of gluten make it possible to increase its solubility. Typically, the hydrolysis and deamidation are obtained under acidic conditions.

By way of indication, an acid hydrolysis can be carried out by using hydrochloric acid or sulfuric acid under conditions known to those skilled in the art.

By way of indication, an enzymatic hydrolysis is carried out using proteolytic enzymes well known to those skilled in the art. Typically, gluten can be hydrolyzed with pepsin and/or papain. Trypsin, chymosin, or chymotrypsin can also be used. Preferentially, the wheat gluten hydrolysate is obtained by enzymatic hydrolysis and has an average molecular weight of between 3 and 20 kDa, preferentially between 4 and 15 kDa Preferentially, the hydrolyzed protein has an average molecular weight of between 4.5 and 12 kDa, 5 and 10 kDa, and typically between 5.5 and 8 kDa.

This average molecular weight can be determined for example by HPLC, by size exclusion chromatography (SEC) or by gel permeation chromatography (GPC) according to conditions well known to those skilled in the art.

Another subject of the present invention relates to a process for the formation of a composition based on phenolic resin, typically an adhesive composition of wood glue type, said process comprising the following steps:
  mixing phenol and a vegetable protein hydrolysate, in the presence of a base solution and of a molar excess of 10% of formaldehyde in a mixer;
  heating the mixture obtained to a temperature of between 90 and 98° C. and maintaining at this temperature for approximately 15 minutes up to one hour;
  adding an additional amount of formaldehyde so as to achieve a phenol:formaldehyde ratio of 1:1.5 to 1:1.7;
  continuing the reaction until a resin with a viscosity of between 0.5 and 0.8 Pa·s at 25° C. is obtained;
  mixing the resin obtained with an agent for accelerating curing.

The mixing according to the process of the invention can be carried out in any type of mixer.

The viscosity can be measured using a Brookfield DV-II+ viscometer at a speed of 50 rpm with an S21 spindle, the samples being maintained at 25° C. by means of a thermoregulated water bath.

Typically, the curing agent is added in an appropriate amount. The term "appropriate amount" is intended to mean an amount which can be considered to be appropriate by those skilled in the art depending on the type of agent for accelerating curing. Typically, in the case of triacetin, an appropriate amount is, for example, between 3% and 20% by weight of triacetin, preferably between 4% and 17%, more preferentially between 5% and 15%, even more preferentially between 6% and 10% or between 6% and 8%, typically approximately 7% by weight.

The invention also relates to the use of a composition according to the invention, for producing particle or fiber boards.

The term "particle or fiber boards" is intended to mean boards composed of particles or of fibers, more particularly fibers of vegetable origin. The particle boards are, for example, products composed of particles or of shavings, obtained by cutting up wood on specialized machines (cutters, hammer mills). The particle boards are defined by standard NF EN 309 and their requirements are specified by standard NF EN 312. Typically, the particles can have sizes of between 1 mm and 10 cm. For example, particles which can reach 10 cm are found in boards of OSB (Oriented Strand Board) type which can be obtained by using the composition according to the invention. The fiber boards are made from lignocellulosic fibers such as wood fibers, flax or hemp, kenaf, sisal, jute, ramie, nettle, bamboo fibers or viscose fibers. Such fiber boards are for example defined by European standard NF EN 316 and their characteristics are specified by European standards NF EN 622-1 to 622-5.

The particle board is produced by mixing wood particles or chopped wood fibers with the adhesive composition according to the invention, and curing the composition under pressure and at high temperatures. Thus, the dose of resin can range between 6% and 12% by dry weight of the wood particles or of the fibers used. Generally, values between 8% and 10% are used.

The invention is applicable to particles or fibers of any type, in particular of vegetable origin, such as wood particles (large shavings, particles, shavings from planing, sawdust) and/or another lignocellulosic material in particle forms (hemp shives, flax shives, bagasse fragments).

The particle board material thus obtained has been tested for its mechanical properties and has clearly shown the influence of the addition of triacetin on a certain number of properties, such as swelling, internal cohesion, elasticity modulus and formaldehyde emission. In addition, the addition of triacetin also results in a reduction in the maximum polymerization temperature.

The invention also relates to the use of a composition according to the invention, for producing rigid phenolic foams or particle or fiber boards, in particular vegetable, and in particular lignocellulosic, particle or fiber boards.

The term "rigid phenolic foams" is intended to mean foams in particular as defined according to ISO 4898 from 2010 in additive n°1 thereof from 1988 (also formerly French standard NF T 56-204). Such foams are obtained from liquid resins. Exothermic crosslinking of the phenol resin causes the vaporization of a swelling agent and the formation of a foam with a high proportion of closed cells. Such foams are used in thermal insulation, in particular in board form.

The invention also relates to the use of a vegetable protein hydrolysate and more particularly a wheat protein hydrolysate in the replacement or reduction of formaldehyde in compositions based on phenolic resin, in particular in resins based on formaldehyde, such as urea-formaldehyde resins (UF-resins), melamine-urea-formaldehyde resins (MUF-resins) and phenol-formaldehyde resins (PF-resins). Typically, 10 to 25 mol % of the phenol of the phenolic resin is replaced with a vegetable protein hydrolysate, the vegetable protein hydrolysate preferentially such that the phenol:aldehyde mole ratio is from 1:1.5 to 1:1.7.

Finally, the invention relates to a rigid phenolic foam board or a particle or fiber board, preferentially with a reduced formaldehyde content, comprising the composition according to the invention.

DETAILED DESCRIPTION OF EMBODIMENTS

Hereinafter, the invention will be illustrated by a certain number of examples concerning the production of the resins and the use thereof as bonding agent during the production of the particle board compositions. These examples can in no way be interpreted as a limitation of the scope of the invention or of the patent rights claimed in the claims.

Example 1: Production of a Phenolic Resin Containing a Protein Hydrolysate

In a 500 ml glass reaction vessel, 105.75 g (0.9 mol) of, a solution of 80% of phenol 50 ml of 30% NaOH (0.35 mol) and a 100 ml solution of 37% formaldehyde (1.2 mol) are mixed together for 30 minutes at 30° C. 11.75 g of wheat protein hydrolysate are then added such that the reaction mixture is heated slowly to 94° C., and then maintained at this temperature for approximately 30 minutes. An additional amount of formaldehyde, which corresponds to 0.5 mol is then added. The reaction is then continued until a viscosity of between 0.5 and 0.8 Pa·s at 25° C. is achieved. The final pH should be around 11.

The resin thus obtained contains 10% of a protein hydrolysate. In order to increase the protein content by 20%, the proportion of phenol is reduced to 94 g (0.8 mol) and the proportion of proteins is increased by 11.75 g.

Three types of wheat protein hydrolysates are used:
SOLPRO® 508 (product sold by TEREOS SYRAL): an enzymatic hydrolysate of wheat gluten;
SOLPRO® 050 (product sold by TEREOS SYRAL): an acid hydrolysate of wheat gluten;
An experimental low-molecular-weight (LMW) wheat protein hydrolysate product having an average molecular weight of approximately 6000 Da.

The inventors demonstrated, by virtue of a preliminary study, that triacetin was more suitable in accelerating the curing of the phenolic compositions comprising a vegetable protein hydrolysate since it confers good curing acceleration for stability of the curing mixture allowing use of the obtained composition in an industrial environment, this being with low amounts. Thus, triacetin showed a mixture stability able to reach five hours for an amount of triacetin of 5% to 10% of the dry matter of the resin. Comparative tests were in particular carried out with esters such as propylene carbonate or methyl formate.

The resins prepared in the following examples were used as such or combined with triacetin (7% of the dry matter of the resin).

Example 2: Production of Particle Boards

Particle boards are produced using the phenolic resins obtained by means of the process described in example 1. The resins used are represented in table 1:

TABLE 1

| Resin | Composition |
|---|---|
| Reference | 100% phenol |
| R1 | 90% phenol-10% LMW |
| R2 | 90% phenol-10% SOLPRO ® 050 |
| R3 | 80% phenol-20% SOLPRO ® 050 |

The particle boards are prepared by mixing 100 g of wood particles (moisture content of 2.5%) with 10 g of resin solids. The resin as such has a moisture content of approximately 50% to 55%. A series of boards is produced without addition of triacetin, and a second series is produced with addition of 7% of resin dry matter (therefore in this case 0.7 g).

The mixtures are then pressed in a mold in order to obtain boards. The mold has the following dimensions: 14×300×350 mm. The processing conditions are the following: heating at 160° C. while applying three consecutive and decreasing pressures. This is represented in table 2:

TABLE 2

| | Pressure (bar) | | |
|---|---|---|---|
| | 80 | 35 | 17 |
| Time (min) | 3 | 2 | 2.5 |

Example 3: Behavior with Respect to Swelling of the Boards Produced

In this example, the behavior with respect to swelling was tested on boards manufactured with the resins prepared in example 1. The boards tested have a thickness of 13 mm. The behavior with respect to swelling is thus determined as described in standard NF B51-262.

First, the thickness of the board is measured and then the board is cured for two hours. After curing, the boards are oven-dried at 103° C., for 24 hours.

The dry swelling value G is then determined as follows:

$$G(\%) = \frac{\text{dry thickness after swelling} - \text{dry thickness before swelling}}{\text{Dry thickness before swelling}} \times 100$$

The effect of the addition of triacetin to the phenolic resins containing the protein hydrolysate is clearly demonstrated in table 3, which shows swelling values which are much lower than those without triacetin.

TABLE 3

Behavior with respect to swelling of the boards based on resins of table 1

| | G (%) without triacetin | G (%) with triacetin |
|---|---|---|
| Reference | 9.9 | 7.8 |
| R1 | 21.9 | 5.4 |
| R2 | 10.7 | 6.2 |
| R3 | 11.7 | 5.5 |

Example 4: Internal Cohesion of the Boards

In this example, the internal cohesion before swelling (according to EN319) and after swelling (according to EN321) is determined. The values are expressed in N/mm² in table 4. These values again show the effect of the presence of triacetin on the phenolic compositions containing proteins.

TABLE 4

Effect of the presence of triacetin on the phenolic compositions containing proteins

| | Internal cohesion before swelling | | Internal cohesion after swelling | |
|---|---|---|---|---|
| | Without triacetin | With triacetin | Without triacetin | With triacetin |
| Reference | 0.58 | 1.01 | 0.18 | 0.59 |
| R1 | 0.28 | 0.60 | 0.00 | 0.21 |
| R2 | 0.31 | 0.68 | 0.06 | 0.36 |
| R3 | 0.68 | 0.86 | 0.17 | 0.50 |

Example 5: Formaldehyde Emission of the Particle Boards

In order to be classified as class E1, the formaldehyde emission of the boards must be less than 6.5 mg/100 g on a dry board, according to EN312, as determined by the method described in EN717-3.

In table 5 below, the formaldehyde emissions of the boards manufactured with adhesives according to the invention are presented.

TABLE 5

Formaldehyde emissions

| Resins cont. 7% triacetin | Formaldehyde emission (mg/100 g) |
|---|---|
| Reference | 3.88 |
| R1 | 3.74 |
| R2 | 4.62 |
| R3 | 2.11 |

The inventors observed that, compared with the boards not comprising gluten hydrolysate, the boards comprising gluten hydrolysate showed a lightening of the board visible to the naked eye. This characteristic of the boards obtained by using the compositions according to the invention makes it possible, for example, to reduce the thickness of the coating required to obtain colored boards and in particular white boards. Such a lightening is particularly advantageous in the principal use of these boards in the construction field.

The invention claimed is:

1. A composition based on phenolic resin, characterized in that it comprises at least one phenolic resin, a wheat gluten hydrolysate, and an agent for accelerating curing selected from triacetin, butyrolactone, caprolactone and propylene carbonate; wherein the phenolic resin is a product of resinous reaction of a phenol with an aldehyde and wherein the phenol:aldehyde mole ratio is from 1:1.5 to 1:1.7.

2. The composition as claimed in claim 1, characterized in that the phenol and the wheat gluten hydrolysate are mixed in a phenol:wheat gluten hydrolysate ratio of 3.2:1 to 7.2:1 by weight.

3. The composition as claimed in claim 1, characterized in that the content of agent for accelerating curing is between 4% and 10% by weight of the resin solids.

4. The composition as claimed in claim 1, characterized in that the wheat gluten hydrolysate is obtained by acid or enzymatic hydrolysis.

5. The composition as claimed in claim 1, characterized in that the wheat gluten hydrolysate is obtained by enzymatic hydrolysis and has an average molecular weight of between 3 and 20 kDa.

6. The composition as claimed in claim 1, characterized in that the wheat gluten hydrolysate is also deamidated.

7. A process for the formation of a composition based on phenolic resin, said phenolic resin being a product of resinous reaction of a phenol with an aldehyde, characterized in that the process comprises the following steps:
mixing phenol and a wheat gluten hydrolysate, in the presence of a base solution and of a molar excess of 10% of formaldehyde in a mixer;
heating the mixture obtained to a temperature of between 90 and 98° C. and maintaining it at this temperature for approximately 15 minutes up to one hour;
adding an additional amount of formaldehyde so as to achieve a phenol:formaldehyde ratio of 1:1.5 to 1:1.7;
continuing the reaction until a resin with a viscosity of between 0.5 and 0.8 Pa·s at 25° C. is obtained;
mixing the resin obtained with an agent for accelerating curing selected from triacetin, butyrolactone, caprolactone and propylene carbonate.

8. A rigid phenolic foam board comprising a composition as claimed in claim 1.

9. A particle or fiber board comprising a composition as claimed in claim 1.

10. The composition as claimed in claim 3, characterized in that the content of agent for accelerating curing is between 6% and 8% by weight of the resin solids.

11. The composition as claimed in claim 5, characterized in that the wheat gluten hydrolysate is obtained by enzymatic hydrolysis and has an average molecular weight of between 4 and 15 kDa.

* * * * *